JOHN HARRY SMITH.
Improvement in Spoons.
No. 120,679.            Patented Nov. 7, 1871.
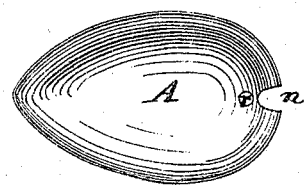
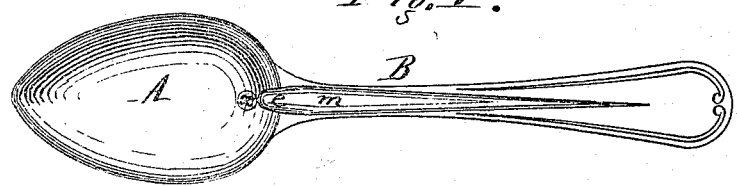

UNITED STATES PATENT OFFICE.

JOHN HARRY SMITH, OF BROOKLYN, NEW YORK, ASSIGNOR TO FLORIAN GROSJEAN, OF SAME PLACE.

IMPROVEMENT IN SPOONS.

Specification forming part of Letters Patent No. 120,679, dated November 7, 1871.

*To all whom it may concern:*

Be it known that I, JOHN HARRY SMITH, of Brooklyn, in the county of Kings and State of New York, have made an invention of a new and useful Improvement in Culinary and other Implements of Sheet Metal; and that the following is a full, clear, and exact description and specification of the same.

The object of my invention is to enable lifting implements for culinary and other purposes, such as spoons, saucerpans, ladles, skimmers, shovels, and forks, to be manufactured of sheet metal at a low cost and with the advantages incident to the use of the fluted or hollow-beaded sheet-metal handle of F. Grosjean. To this end my invention consists of the combination of a fluted or hollow-beaded handle with the bowl or corresponding part of the implement in such manner that the end of the raised hollow bead of the handle enters a notch in the bowl or corresponding part and opposes the edgewise movement of either relatively to the other. Consequently a single rivet is sufficient to secure the handle and bowl to each other; and the implement, being composed of pieces of small size, may be made out of the small scrap-pieces produced in the manufacture of larger implements.

In order that my invention may be fully understood, I have represented in the accompanying drawing a spoon embodying it.

Figure 1 represents the complete spoon. Fig. 2 represents the handle detached from the bowl. Fig. 3 represents a transverse section of the handle at the line $x\ x$ of Fig. 2. Fig. 4 represents the bowl detached from the handle.

The bowl A and handle B are cut out of sheet metal by punches, and are stamped into form in the manner practiced in the manufacture of stamped sheet-metal ware. The handle is stamped with a hollow bead, $m$, and the bowl is notched at its butt by punching out a part of the metal, as represented at $n$, to receive the projecting end $e$ of the hollow bead $m$ of the handle B. A rivet-hole, $s$, is punched in the handle, and a corresponding hole, $r$, is punched in the bowl. The two parts are then applied to each other and secured by a rivet, $x$, as seen in Fig. 1. The notch $n$ in the bowl and the end $e$ of the hollow bead of the handle lock together as a tongue and groove, and oppose the edgewise movement of the handle and bowl relatively to each other, so that neither can turn upon the rivet. The hollow bead and notch may, of course, be duplicated, if desired.

After the rivet is applied the implement may with advantage be dipped in melted tin so as to fill the seam between the handle and bowl.

Having thus described my invention, I declare that I am aware that the handles and bowls of spoons and other articles have been connected by rivets, and that in some cases the bowls have been notched and in others recessed; but, as no one of said pre-existing articles contains a notched bowl combined with a hollow-beaded handle, they do not contain my invention, and I desire to exclude them from my claim.

I claim as my invention, and desire to secure by Letters Patent—

The combination of the bowl and the hollow-beaded handle of the sheet-metal implement by means of the raised hollow bead upon one of the two entered into a notch in the other of the two, substantially as before set forth.

In testimony whereof I have hereunto set my hand this 12th day of July, A. D. 1871.

JOHN HARRY SMITH.

Witnesses:
 E. W. MARTIN,
 C. W. ANDERSON.